(12) United States Patent
Baughman et al.

(10) Patent No.: US 10,832,734 B2
(45) Date of Patent: Nov. 10, 2020

(54) DYNAMIC AUDIOVISUAL SEGMENT PADDING FOR MACHINE LEARNING

(71) Applicant: International Business Machines Corporation, Armonk, NY (US)

(72) Inventors: Aaron K. Baughman, Cary, NC (US); Stephen C. Hammer, Marietta, GA (US); Gray Cannon, Miami, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/283,912

(22) Filed: Feb. 25, 2019

(65) Prior Publication Data

US 2020/0273495 A1   Aug. 27, 2020

(51) Int. Cl.
*G11B 27/036* (2006.01)
*G06N 3/08* (2006.01)
*G06K 9/42* (2006.01)
*G06K 9/00* (2006.01)
*H04N 21/25* (2011.01)
(Continued)

(52) U.S. Cl.
CPC ........ *G11B 27/036* (2013.01); *G06K 9/00724* (2013.01); *G06K 9/00751* (2013.01); *G06K 9/42* (2013.01); *G06K 9/6257* (2013.01); *G06N 3/088* (2013.01); *H04N 21/23418* (2013.01); *H04N 21/251* (2013.01); *H04N 21/8456* (2013.01); *H04N 21/8549* (2013.01)

(58) Field of Classification Search
CPC .......................... G11B 27/036; G06K 9/00724
See application file for complete search history.

(56) References Cited

U.S. PATENT DOCUMENTS 5,327,518 A   7/1994   George
5,596,159 A   1/1997   O'Connell
(Continued)

FOREIGN PATENT DOCUMENTS

CN   1613072 A    5/2005
CN   107464210 A  12/2017
(Continued)

OTHER PUBLICATIONS

"Contextual Advertising Based on Content Recognition in a Video", An IP.com Prior Art Database Technical Disclosure, Authors et. al.: Disclosed Anonymously, IP.com No. IPCOM000251991D, IP.com Electronic Publication Date: Dec. 13, 2017, 35 pages.

(Continued)

*Primary Examiner* — Girumsew Wendmagegn
(74) *Attorney, Agent, or Firm* — Andrew Aubert

(57) ABSTRACT

Techniques for padding audiovisual clips (for example, audiovisual clips of sporting events) for the purpose of causing the clip to have a predetermined duration so that the padded clip can be evaluated for viewer interest by a machine learning (ML) algorithm. The unpadded clip is padded with audiovisual segment(s) that will cause the padded clip to have a level of viewer interest that it would have if the unpadded clip had been longer. In some embodiments the padded segments are synthetic images generated by a generative adversarial network such that the synthetic images would have the same level of viewer interest (as adjudged by an ML algorithm) as if the unpadded clip had been shot to be longer.

15 Claims, 7 Drawing Sheets

(51) Int. Cl.
*H04N 21/234* (2011.01)
*H04N 21/8549* (2011.01)
*H04N 21/845* (2011.01)
*G06K 9/62* (2006.01)

(56) References Cited

U.S. PATENT DOCUMENTS

| | | | |
|---|---|---|---|
| 5,793,888 | A | 8/1998 | Delanoy |
| 5,819,247 | A | 10/1998 | Freund |
| 6,266,068 | B1 | 7/2001 | Kang |
| 6,513,025 | B1 | 1/2003 | Rosen |
| 7,024,033 | B2 | 4/2006 | Li |
| 8,207,989 | B2 | 6/2012 | Mei |
| 8,990,125 | B2 | 3/2015 | Raichelgauz |
| 9,218,606 | B2 | 12/2015 | Raichelgauz |
| 9,786,084 | B1 | 10/2017 | Brat et al. |
| 10,043,109 | B1 | 8/2018 | Du et al. |
| 10,074,038 | B2 | 9/2018 | Hsieh et al. |
| 2005/0185918 | A1* | 8/2005 | Lowe .............. H04N 7/17318 386/228 |
| 2008/0304807 | A1* | 12/2008 | Johnson ............. G06F 3/04847 386/278 |
| 2014/0086554 | A1 | 3/2014 | Yehezkel |
| 2014/0321831 | A1* | 10/2014 | Olsen .................. G11B 27/034 386/241 |
| 2016/0365121 | A1 | 12/2016 | Decaprio |
| 2017/0372505 | A1 | 12/2017 | Brat et al. |
| 2018/0075581 | A1 | 3/2018 | Shi |
| 2018/0268201 | A1 | 9/2018 | Yu et al. |

FOREIGN PATENT DOCUMENTS

| | | |
|---|---|---|
| CN | 107707931 A | 2/2018 |
| CN | 108256627 A | 7/2018 |

OTHER PUBLICATIONS

"Correcting Image Anomalies Using Machine Learning", An IP.com Prior Art Database Technical Disclosure, Authors et. al.: Disclosed Anonymously IP.com No. IPCOM000252094D, IP.com Electronic Publication Date: Dec. 15, 2017, 36 pages.

"Determining Projection Format for a Video", An IP.com Prior Art Database Technical Disclosure, Authors et. al.: Disclosed Anonymously, IP.com No. IPCOM000252292D, IP.com Electronic Publication Date: Jan. 3, 2018, 34 pages.

"Improving Appeal of an Advertisement Based on Linguistic Trends", An IP.com Prior Art Database Technical Disclosure, Authors et. al.: Disclosed Anonymously, IP.com No. IPCOM000252022D, IP.com Electronic Publication Date: Dec. 13, 2017, 36 pages.

"Removing Breathing Artifacts From Audio", An IP.com Prior Art Database Technical Disclosure, Authors et. al.: Disclosed Anonymously, IP.com No. IPCOM000252006D, IP.com Electronic Publication Date: Dec. 13, 2017, 33 pages.

Mohamed, S. et al., "Tutorial on Deep Generative Models", UAI 2017 Australia, Deep Mind, 96 pages.

Song, Y. et al.; "Talking Face Generation by Conditional Recurrent Adversarial Network", 2017, 19 pages.

Wan, CH. et al., "Towards Audio to Scene Image Synthesis Using Generative Adversarial Network", Aug. 2018, 7 pages.

International Search Report and Written Opinion, International Application No. PCT/IB2020/051586, International Filing Date Feb. 25, 2020.

* cited by examiner

DYNAMIC AUDIOVISUAL SEGMENT PADDING FOR MACHINE LEARNING

BACKGROUND

The present invention relates generally to the field of training machine learning models, and more particularly to content normalization for training machine learning media interpretation models.

Machine learning (ML) is the scientific study of algorithms and statistical models that computer systems use to effectively perform a specific task without using explicit instructions, relying on models and inference instead, often seen as a subtype of artificial intelligence. Machine learning algorithms build a mathematical model of sample data, known as "training data", in order to make predictions or decisions without being explicitly programmed to perform the task. As a simple example, a machine learning program may be given as training data: (i) a large set of images that show various cats; and (ii) labels that identify each of the images as showing a cat. Based on this training data, the ML algorithms of the ML program may find patterns in the image data that are taken to be indicative of an image showing a cat. Then, when a new unlabeled image is received by the ML program, the ML algorithm can determine that the newly-received image exhibits the patterns that are indicative of a cat image and identify the newly-received image as a cat image. These patterns upon which machine learning is based may be revised over time, as additional images and/or labels are received. In this way, an image that was incorrectly identified as a cat image one month, might be correctly identified as a non-cat image in the next month.

To explain ML in more detail, there are three types of approaches to training ML processes: supervised/semi-supervised learning, unsupervised learning, and reinforcement learning. Supervised learning algorithms create a mathematical model of a set of data that includes both the inputs and the desired outputs. The data is often referred to as training data and contains a set of training examples. Each training example has at least one input and a desired output, sometimes called a supervisory signal. With semi-supervised learning algorithms, some training examples do not include the desired output. Unsupervised learning algorithms receive a set of data that contains only input values, and identify structure in the data, like grouping or clustering of data points. The algorithms typically learn from test data that has not been labeled, classified or categorized. Instead of reacting to feedback, unsupervised learning algorithms determine commonalities in the data and respond based on the presence or absence of such commonalities in every new segment of data. Reinforcement learning is an area of machine learning concerning how software agents should take actions in a given environment so as to maximize some notion of cumulative reward.

Generative adversarial networks (GANs) are a class of artificial intelligence algorithms used in unsupervised machine learning, implemented by a system of two neural networks contesting with each other in a zero-sum game framework.

Segment padding is a method of extending an audio and/or video (sometimes herein collectively referred to as A/V) segments so that the A/V segment has a predetermined length. Segment padding is conventionally used in conjunction with ML algorithms because training A/V segments and/or newly-received A/V segments are expected by the algorithm to have a certain predetermined time duration to work with the code of the ML algorithms. After the ML algorithms classify a newly-received, padded A/V segment in some fashion, then the classification can be applied to the segment as it existed prior to the padding. A couple of currently conventional padding techniques are as follows: (i) inserting frames in a video with all one color (mono-color), along with silence or some other kind of static audio information; and/or (ii) repeating (also called "looping") the too-short footage so that it fills up the predetermined time allotment of the for an A/V clip.

SUMMARY

According to an aspect of the present invention, there is a computer-implemented method, computer program product and/or computer system for performing the following operations (not necessarily in the following order): (i) receiving a first unpadded audiovisual segment data set including information indicative of a first unpadded audiovisual segment, with the first unpadded audiovisual segment corresponding to audiovisual data recorded at a sporting contest for a human audience; (ii) determining a set of padding time interval(s) occurring before and/or after the unpadded segment; (iii) for each given padding time interval of the set of padding time interval(s): (a) determining a respectively corresponding sports viewer interest value that would characterize the given padding time interval if the first unpadded audiovisual segment continued through the given padding time interval and had its sports viewer interest value determined by a machine learning (ML) algorithm, and (b) generating a padding audiovisual segment for the given padding time interval so that the padding audiovisual segment for the given padding time interval is characterized by the sports viewer interest value determined for the given padding time interval; (iv) assembling the first unpadded audiovisual segment with the padding audiovisual segment(s) corresponding to each padding time interval of the set of padding time interval(s) to obtain a first padded audiovisual segment data set including information indicative of a first padded audiovisual segment; and (v) determining, by the ML algorithm, a sports viewer interest value for the first padded audiovisual segment considered as a whole.

According to a further aspect of the present invention, there is a computer-implemented method, computer program product and/or computer system for performing the following operations (not necessarily in the following order): (i) receiving a first unpadded audiovisual segment data set including information indicative of a first unpadded audiovisual segment; (ii) determining a set of padding time interval(s) occurring before and/or after the unpadded segment; (iii) for each given padding time interval of the set of padding time interval(s): (a) determining a respectively corresponding viewer interest value that would characterize the given padding time interval if the first unpadded audiovisual segment continued through the given padding time interval and had its viewer interest value determined by a machine learning (ML) algorithm, (b) generating a synthetic audiovisual segment for the given padding time interval so that the padding audiovisual segment for the given padding time interval is characterized by the viewer interest value determined for the given padding time interval; (iv) assembling the first unpadded audiovisual segment with the padding audiovisual segment(s) corresponding to each padding time interval of the set of padding time interval(s) to obtain a first padded audiovisual segment data set including information indicative of a first padded audiovisual segment; and (v) determining, by the ML algorithm, a sports viewer interest value for the first padded audiovisual segment considered as a whole.

According to a further aspect of the present invention, there is a computer-implemented method, computer program product and/or computer system for performing the following operations (not necessarily in the following order): (i) receiving a plurality of historical audiovisual segment data sets, with each historical audiovisual segment data set including information of a historical audiovisual segment; (ii) receiving a first unpadded audiovisual segment data set including information indicative of a first unpadded audiovisual segment; (iii) determining a set of padding time interval(s) occurring before and/or after the unpadded segment; (iv) for each given padding time interval of the set of padding time interval(s), generating a padding audiovisual segment from one, or more, historical audiovisual segments so that the padding audiovisual segment has audiovisual content similar to what the given padding time interval would have contained if the first unpadded audiovisual segment continued through the given padding time interval; (v) assembling the first unpadded audiovisual segment with the padding audiovisual segment(s) corresponding to each padding time interval of the set of padding time interval(s) to obtain a first padded audiovisual segment data set including information indicative of a first padded audiovisual segment; and (vi) determining, by the ML algorithm, a viewer interest value for the first padded audiovisual segment considered as a whole.

DETAILED DESCRIPTION

Figure 1:
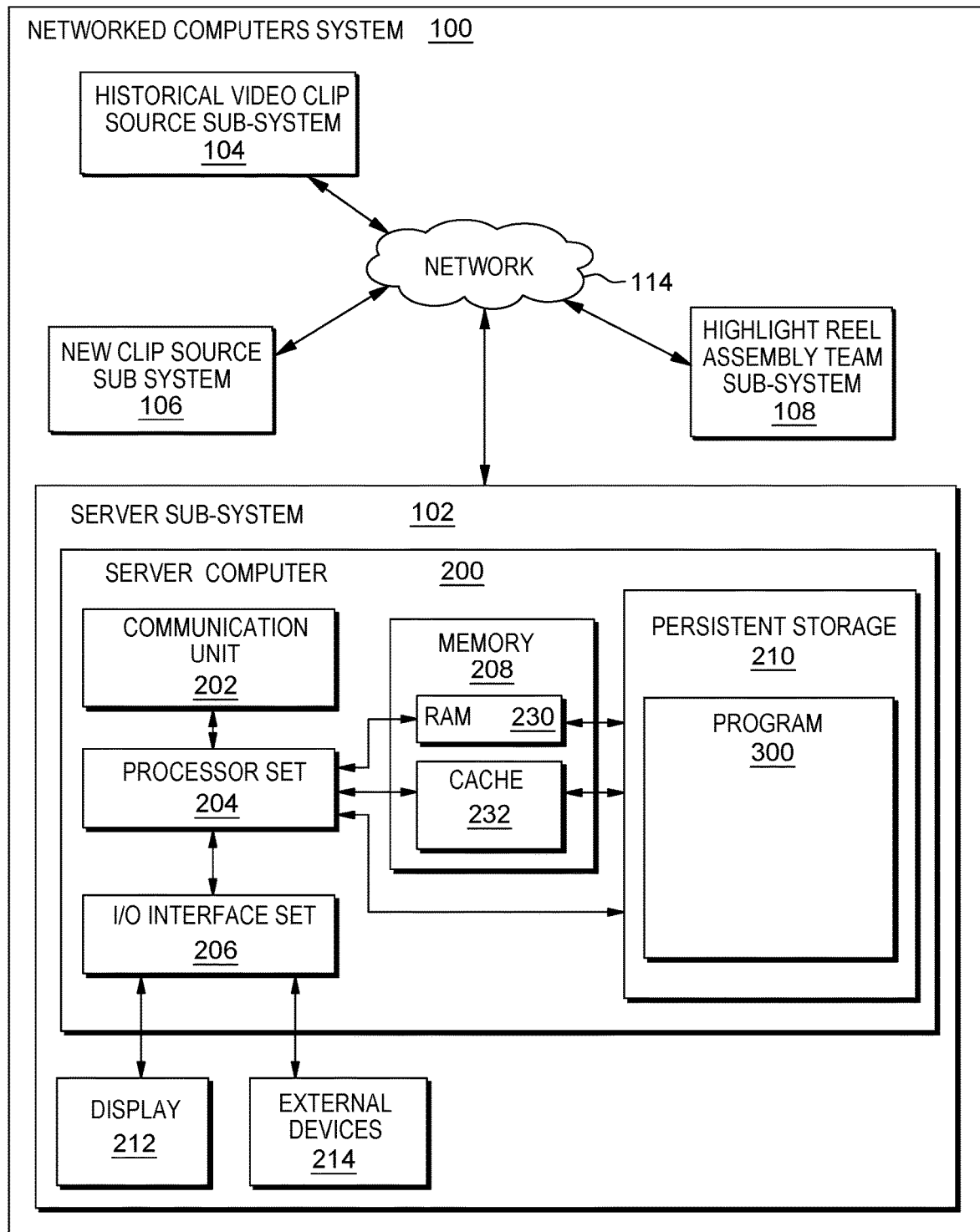
FIG. 1 is a block diagram view of a first embodiment of a system according to the present invention.

Some embodiments of the present invention are directed to techniques for padding A/V segments so that they have a predetermined length while exhibiting a level of "viewer interest" that the segment would have had if it had been a full-length clip. This is useful when a machine learning algorithm determines a viewer interest level for the A/V clip for possible use in a larger A/V presentation, such as sports highlight reels or a trailer for a movie. "Viewer interest" refers to how interesting viewers would find the A/V clip to be. For example, a clip showing the anguished face of a losing tennis player might be expected to have a higher level of viewer interest than a clip of a ball boy impassively retrieving an errant tennis ball. Sports viewer interest values refers to a quantification of how interesting viewers of sports A/V clips would find a given A/V clip. By having clips with a uniformly high level of viewer interest, or perhaps a desired pattern of ups and downs in viewer interest, an appropriate highlight reel can be assembled (for example, assembled automatically by computer software based upon the calculated viewer interest levels of various clips).

Before moving to more detailed descriptions of various embodiments of the present invention, a fundamental point will be made about what the padding techniques of the present invention is supposed to accomplish. The point is that the padding should not have more, or less, viewer interest during the padding than if the segment had originally been sufficiently long. This is a very subtle, but important, point, and will be further explained with an example in the next paragraph.

For example, say that footage of a great catch in a baseball game is three (3) seconds long, and the predetermined A/V segment length is nine (9) seconds. In this example, looping the three second clip three times to be nine seconds would lead to an abnormally high level of determined viewer interest because great catches do not last nine seconds, and the level of viewer interest if the clip were nine seconds long would be expected to be high during the three seconds of the catch, but lower during the three seconds before the catch or the three seconds after the catch. The present invention strives to approximate the viewer interest level as if the clip included what a television crew would have shot before and/or after the clip, and then included that with the clip. For example, if the three seconds before the unpadded clip started would be expected to look like a routine fly ball, then this might have a fairly low level of viewer interest (although probably a greater level of viewer interest than a blank screen). To further develop this example, if the three seconds after the unpadded clip would typically be a disappointed hitter throwing down her baseball bat in disgust, then this might have a relatively high level of viewer interest (although probably less than the great catch itself). This is the type of thing that the present invention seeks to emulate—that is, a level of viewer interest that would reflect the level of viewer interest if the clip had been shot to be longer in the first instance.

Roughly speaking, there are two different ways to carry out the padding according to the present invention: (i) use actual pre-existing A/V segments as padding for the too-short A/V segment of interest; or (ii) generate synthetic A/V images that would be determined by an ML algorithm to have a level of viewer interest consistent with analogous hypothetical portions of a full length clip. It is noted that the words "would be determined by an ML algorithm to have a level of viewer interest" were carefully chosen here—synthetic images especially might not be understandable to human viewers even though they might emulate a given level of viewer interest as far as the processing of an ML algorithm is concerned. In other words, the actual padding of some embodiments of the present invention might have extremely low levels of viewer interest if human viewers were to actually watch the padding and rate their interest levels. However, the padding would be constructed so that the data corresponding to the padding would be characterized by patterns that would indicate a level of viewer interest to an ML algorithm that would be consistent with a longer clip that did not require padding.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server system 102 (also sometimes referred to as machine learning system); historical video clip source sub-system 104; new clip source sub-system 106; and highlight reel assembly team sub-system 108; and communication network 114. Sever system 102 includes: server computer 200 (also sometimes called machine learning computer); communications unit 202; processor set 204; input/output (I/O) interface set 206; memory 208; persistent storage 210; display device 212; external device set 214; random access memory (RAM) 230; cache memory 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of Sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for server sub-system 102; and/or (ii) devices external to server sub-system 102 may be able to provide memory for server sub-system 102.

Program 300 is stored in persistent storage 210 for access and/or execution by one or more of the respective processor sets 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to server sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
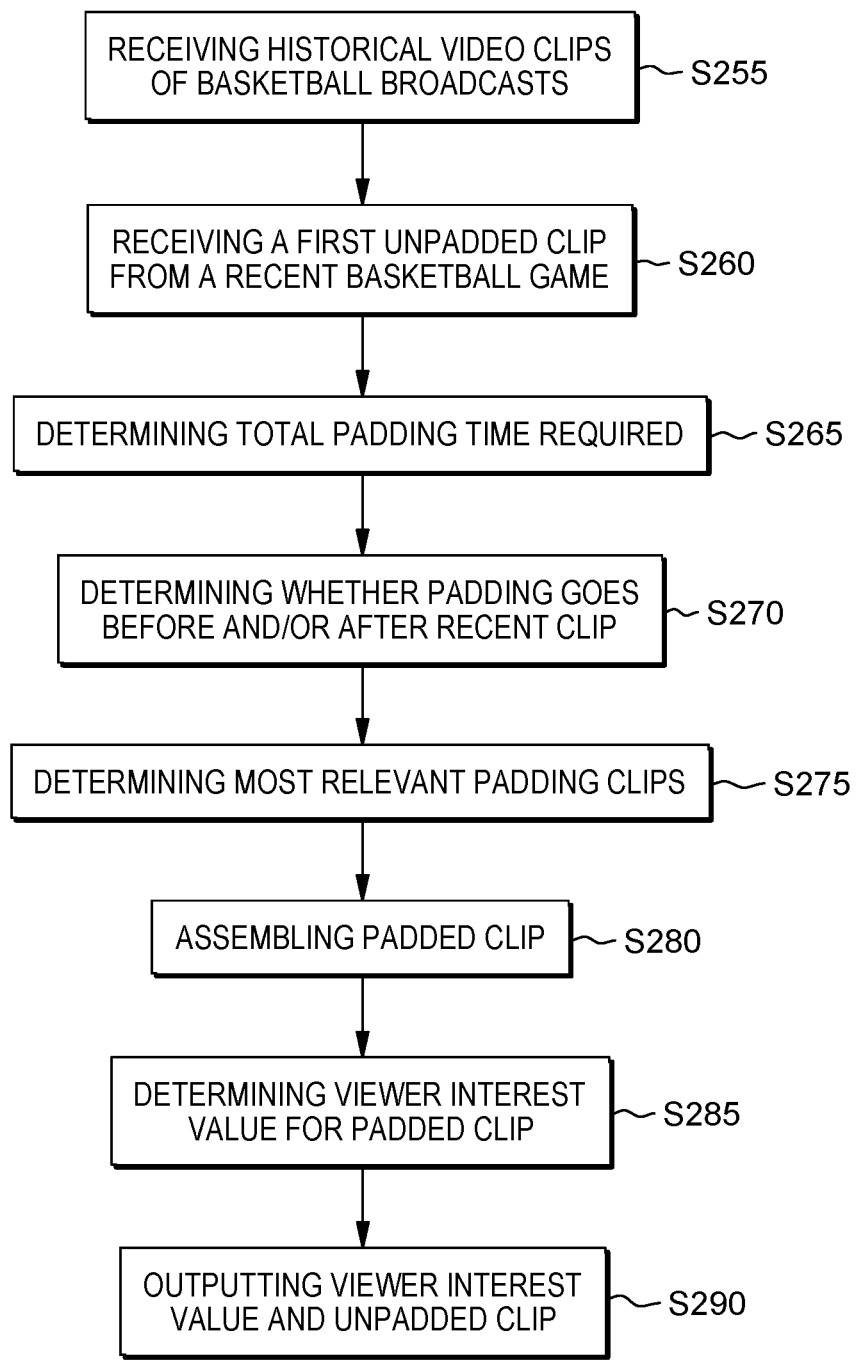
FIG. 2 is a flowchart showing a first embodiment method performed, at least in part, by the first embodiment system.
Figure 3:
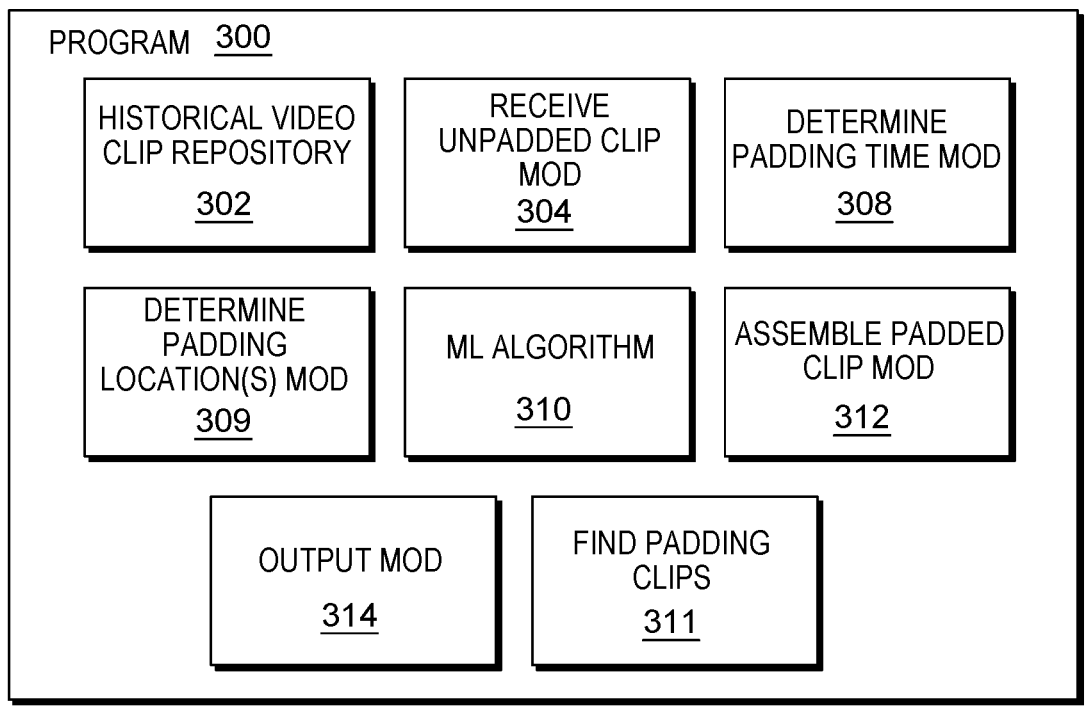
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks), FIG. 3 (for the software blocks), and FIGS. 4A through 4E for example data samples and screenshots.

Processing begins at operation S255, where historical video clip source sub-system 104 sends audiovisual segments (sometimes herein referred to as "clips") through communication network 114 (see FIG. 1) to historical video clip repository 302.

In this embodiment, these clips: (i) have been collected from broadcast television footage of professional basketball games going back to 1957; (ii) have each been trimmed to be exactly six (6) seconds in length; and (iii) have each been "labelled" with metadata.

In this embodiment, the metadata for each clip includes the following categories of metadata: (i) a category of play (for example, foul shot, three point miss, three point basket, dunk, etc.); (ii) a natural language description of the play (for example, dunk with 20 inch vertical leap, dunk with take off at the foul line, etc., flagrant foul, etc.); (iii) statistics for each of the principal player(s) involved (for example, name, height, weight, age, lifetime points, points in the game of the clip, position, college team, etc.); (iv) venue/date/team information (for example, arena where the game took place, attendance, weather on game day. date of game, won loss records of the teams on game day, season long won loss records for team, identification of home team, referees on duty, etc.); (v) viewer interest value for clip as a whole (for example, a six second clip of the greatest dunk ever might rate a 1.00, while a six second clip of an obscure player re-tying her shoes during a lull in the game's action might rate a 0.01 viewer interest value); and (vi) viewer interest values for each two second sub-segment of each audiovisual segment (for example, a clip might have a viewer interest value of 0.10 for its first two seconds, a viewer interest value of 0.40 for its second two seconds and a viewer interest value of 0.85 for its last two seconds). With respect to items (v) and (vi) in the foregoing list, the viewer interest value for the six second clip, considered as a whole, will generally not be the same as the average of the viewer interest value of its two second sub-segments.

In this embodiment, at operation S255, these historical video clips are used as training data sets to train ML algorithm 310 to recognize and categorize new video clips with respect to all the various types of labelling identified in the previous paragraph.

Processing proceeds to operation S260, where new clip source sub-system 106 sends a new two (2) second unpadded clip through network 114 (see FIG. 1) to receive unpadded clip module 304. While it is desired to label this clip, especially with respect to viewer interest, by ML algorithm 310, the unpadded clip cannot immediately be processed by ML algorithm 310 because ML algorithm 310 is designed and programmed to handle six (6) second clips. A representative image (or "frame") of this two second unpadded clip is shown by screen shot 400a of FIG. 4A. The metadata for this unpadded two second clip includes the following: (i) category of play is dunk; (ii) a natural language description of the play is dunk with 20 inch vertical leap with takeoff and landing in the vicinity of the hoop; (iii) statistics for each of the principal player(s) involved include name Abel Adams, height 6 feet six inches, weight is 175 pounds, age is 25, lifetime points 562, points in the game of the clip 12, position is center, college team is Ginormous University; and (iv) venue is New York Arena, date of game is 1 Jan. 2019, Adams' team is New York Jellyfish information, paid attendance was 30,000, weather on game day was wintery mix, won-loss records of New York Jellyfish on game day was 30-30, season long won-loss New York Jellyfish is not yet determined as of time of receipt of the two second unpadded clip, the New York Jellyfish were the home team, referee on duty was Anderson Sanderson. In this example, some of the foregoing labelling data came from human labelling applied at new clip source sub-system 106, while other pieces of the foregoing labelling information where determined by ML algorithm 310.

The viewer interest value for two second unpadded clip 400a as a whole has not been determined, but will be determined in subsequent operations of flowchart 250 so that highlight reel assembly team sub-system can decide whether to include it in a highlights reel for Jan. 1 to Jan. 3, 2019.

Processing proceeds to operation S265 where the total duration of required padding time is determined by determine padding time module ("mod") 308. In this example, this is a straight forward calculation. Specifically, the unpadded clip is two (2) seconds long, and the padded clip is required to be six (6) seconds long so that ML algorithm 310 can accurately determine viewer interest, which means that four (4) seconds of total padding is needed.

Processing proceeds to operation S270, where determine padding location(s) mod 309 determines that two (2) seconds of padding should be inserted prior to the point in time at which the unpadded clip begins, and two (2) seconds of padding should be inserted after the unpadded clip is over. Other embodiments may determine padding locations in other ways. For example, in the embodiment discussed in the next sub-section of this Detailed Description section, the padding is always inserted after the unpadded clip.

Processing proceeds to operation S275 where the most relevant padding clips are determined by find padding clips mod 311. In this embodiment, and as will be explained in some detail with respect to this example, the padding clips are taken from historical video clips stored in historical video clip repository 302. Before discussing this, it is important to note that some embodiments may work in a fundamentally different way, as will be discussed in the following sub-section of this Detailed Description section. This fundamentally different way is to generate synthetic video by a generative adversarial network (GAN). It is further noted that both embodiments like the embodiment under discussion that uses actually pre-existing video, and also embodiments that use synthetic video, have in common the fact that the padding clips are selected and/or generated so that the padded clip will have a viewer interest value (as adjudged by ML algorithm(s)) as if the unpadded clip were not padded.

The conceptual difficulty is that the viewer interest value for the padded clip is not yet known—that is, a major objective of some embodiments of the present invention is to use the padded clip to determine the viewer interest value. In the embodiment under discussion, the way that the padding is determined so that it will lead to the correct viewer interest value is to try to figure out what a broadcast television crew would have shot and edited the clip to include had it been six (6) seconds in duration. As will be discussed, in this example, this hypothetical longer clip uses actual footage from longer pre-existing historical clips that are most similar to the unpadded clip. In other embodiments that generate synthetic video, other methods are used to generate synthetic padding such that the ML algorithm(s) will determine a viewer interest value for the padded clip (as determined by the ML algorithms and not necessarily as would be determined by a human expert viewer) that would be expected to obtain if the unpadded clip were longer.

These methods of generating synthetic video that lead to a padded clip suitable for use in determining a viewer interest value will be fully explained in the next sub-section of this Detailed Description section.

Figure 4A:
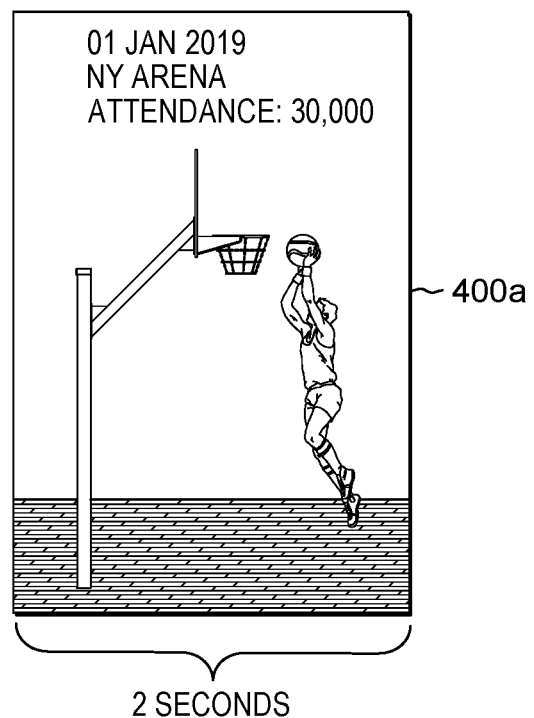
FIGS. 4A through 4D are screenshots of multimedia data samples helpful in understanding the first embodiment system.
Figure 4B:
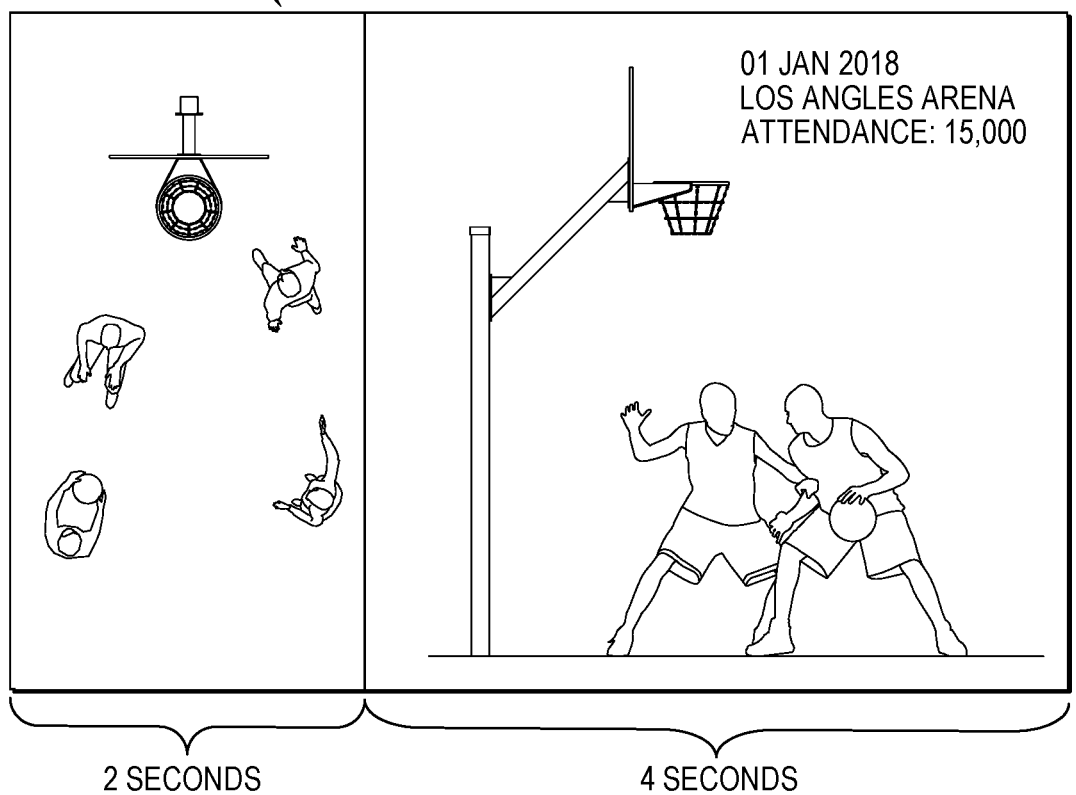

Getting back to operation S275 of flowchart 250, a scan of historical video clip repository 302 by find padding clips mod 311 discovers six (6) second clip 400 that includes two seconds of audiovisual that occur before a dunk shown in the clip (see FIG. 4B). Clip 400b has the following labelling in its metadata: (i) category of play is dunk; (ii) a natural language description of the play is dunk with takeoff from 18 inches beyond the foul line; (iii) statistics for each of the principal player(s) involved include name Abel Adams, height 6 feet six inches, weight is 171 pounds, age is 24, lifetime points 562, points in the game of the clip 14, position is center, college team is Ginormous University; and (iv) venue is Los Angeles, date of game is 1 Jan. 2018, Adams' team is Los Angeles Mitochondria, paid attendance was 15,000, weather on game day was blistering heat. won-loss records of Los Angeles Mitochondria on game day was 31-29, season long won-loss for Los Angeles Mitochondria was 62-58, the Los Angeles Mitochondria were the home team, referee on duty was Betty McNetty. It is noted that the dunker in this clip is the same person as the dunker in the unpadded clip, although he apparently played for a different team a year earlier.

At operation S275, it is determined that this clip is the most similar clip that includes footage occurring before the dunk, so the first two seconds of this clip are selected as being the most relevant to provide the needed padding footage that will be used to make the first two seconds of the padded clip. To be more specific, in this particular example, the machine logic of find padding clips mod 311 used the following factors to determine that clip 400b was the most similar clip with suitable pre-padding: (i) similarity of the play (both plays are dunks, but one is a primarily vertical dunk and the other is a primarily horizontal dunk as can be seen by comparing FIG. 4A to FIG. 4B); (ii) similarity of players (the dunker in clip 400a and 400b are the same player); (iii) similarity of venue/team/crowd (the venues and teams and crowd size are pretty different, although the dunker is on the home team in both clip 400a and clip 400b); and (iv) recentness of clip (the clips are only one year apart). Because clip 400b is the most relevant clip with pre-padding material, the first two seconds of clip 400b will be used as pre-padding in this example. As shown in FIG. 4B, this pre-padding is a top down view of half of the court as it appeared before Adams leapt up and made his dunk shot.

Figure 4C:
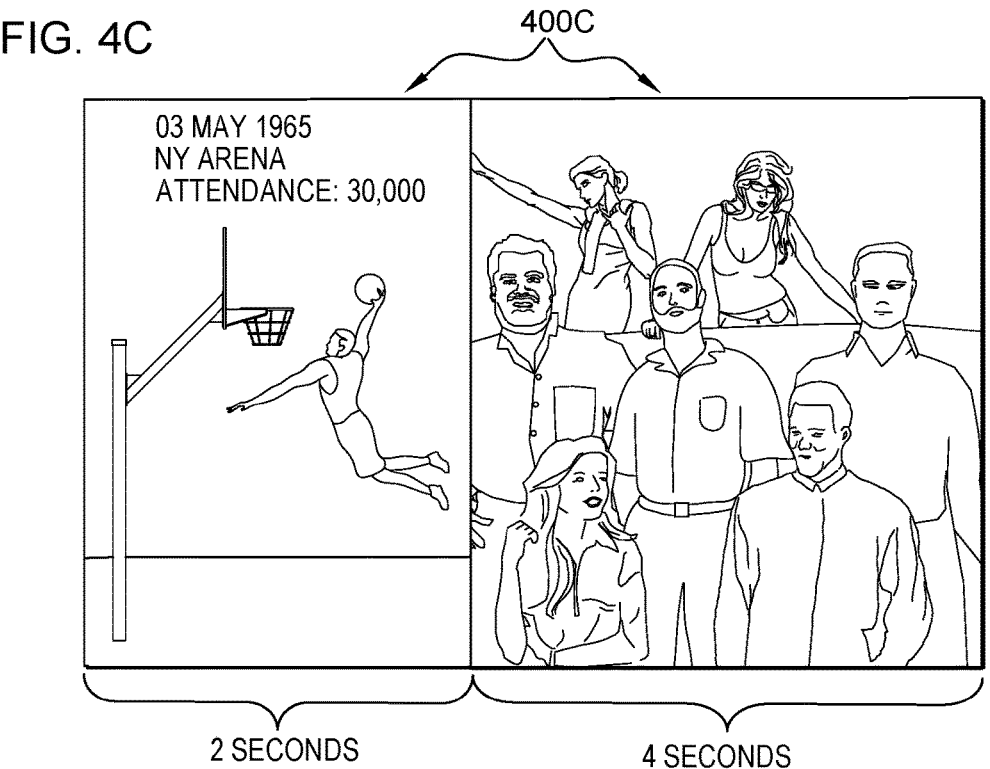
Figure 4D:
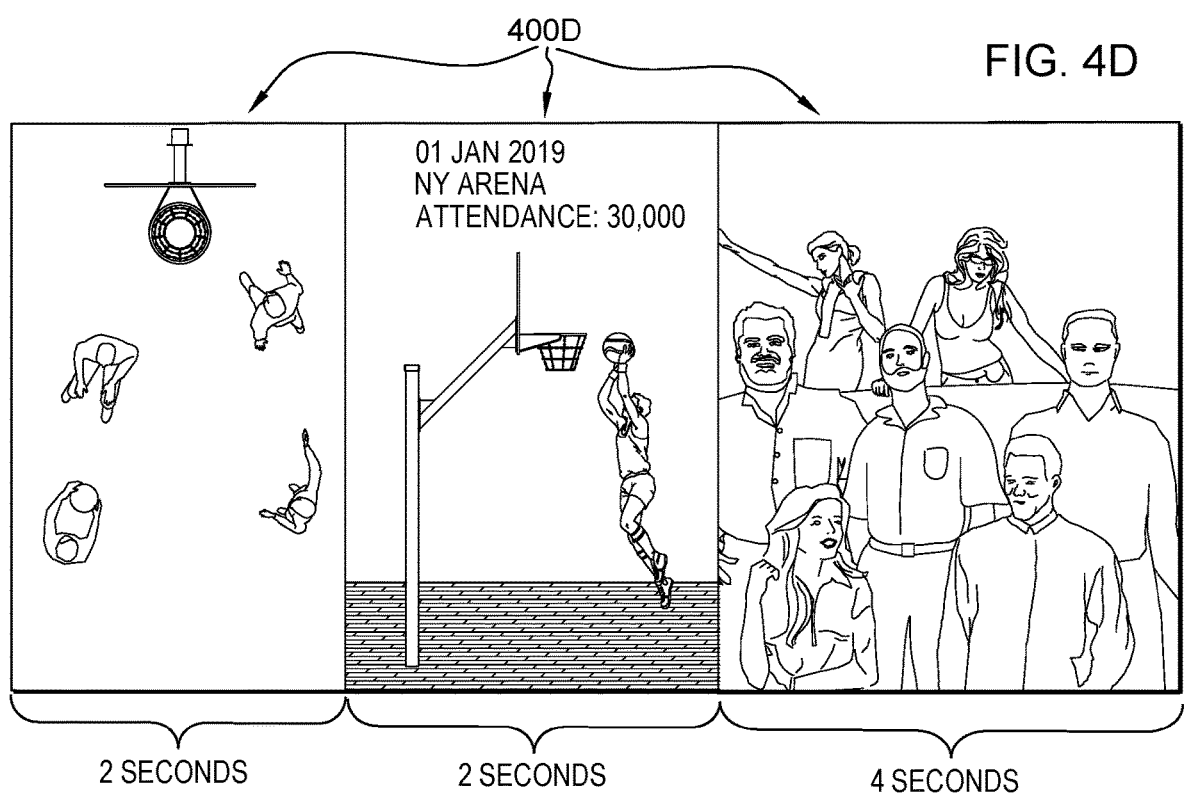

At operation S275, it is further determined clip 400c (see FIG. 4C) is the most similar clip that includes footage occurring after the dunk, so the last two seconds of clip 400c are selected as being the most relevant to provide the needed padding footage that will be used to make the final two (2) seconds of the padded clip. To be more specific, in this particular example, the machine logic of find padding clips mod 311 used the following factors to determine that clip 400c was the most similar clip with suitable post-padding: (i) similarity of the play (both plays are vertical dunks that look astonishing similar as can be seen by comparing FIG. 4A to FIG. 4C); (ii) similarity of players (the dunker in clip 400c is Laura Oldtimer who was a basketball star on the New York Jellyfish back in the 1960s—in this example, she has similar lifetime stats to Abel Adams); (iii) similarity of venue/team/crowd (the venues and teams and crowd size are identical here as between clip 400a and clip 400c); and (iv) recentness of clip (in this example, the two clips are widely spaced apart in time, which cut against a finding of similarity/relevancy here). Because clip 400c is the most relevant clip with pre-padding material, the final two seconds of clip 400b will be used as post-padding in this example. As shown in FIG. 4C, this post-padding is a view of a cheering crowd, with a close up on the faces of a couple of fans after Oldtimer leapt up and made her dunk shot.

Processing proceeds to operation S280, where assemble padded clip mod 312 assembles six (6) second padded clip 400d (see FIG. 4D) based on the padding clip(s) chosen at operation S275. It is noted that this six (6) padded clip is not intended to be shown to human audiences, but, rather, only used by ML algorithm 310 to determine a viewer interest value.

Processing proceeds to operation S285, where ML algorithm 310 determines a viewer interest value for padded clip 400d. In this example, the viewer interest value is 0.51. This is a different viewer interest value than what would have been obtained if unpadded clip 400a had simply been looped three times, and it is also a different viewer interest value than what would have been obtained if the padding were merely a blank screen. In this way, some embodiments of the present invention may provide more accurate viewer interest values than what would have been obtained through conventional audiovisual segment padding techniques.

Processing proceeds to operation S290, where output mod 314 of program 300 of server sub-system 102 (see FIG. 1) sends unpadded clip 400a along with metadata indicating a viewer interest value of 0.51 through network 114 to highlight reel assembly team sub-system 108 to consider for use in assembling a highlight reel for basketball games played between Jan. 1 and Jan. 3, 2019. In this example, the clips for the highlight reel are chosen and ordered by humans. In this example, they do decide to use clip 400a, partially because its viewer interest value is fairly decent, and also because the highlight reel needs two seconds of footage so that it will have a specified, predetermined length for use on a sports show that will be shown on television, and also on a streaming site distributed over the internet.

III. Further Comments and/or Embodiments

Some embodiments of the present invention recognize the following facts, potential problems and/or potential areas for improvement with respect to the current state of the art: (i) for a machine learning model to be effective, the features of its input data should be normalized, so no feature has an outsized impact due to the range of its values; (ii) models analyzing video and audio need input data to be consistent in duration because longer durations could inflate the weights used in the model; (iii) for this reason, content pieces should be divided into segments of equal duration prior to analysis; (iv) data preparation is particularly important when using deep neural networks because the feature analysis at a given layer may be non-obvious, and the inclusion of a lurking variable, such as duration, would be less evident; (v) for content pieces of varying duration, the researchers must decide how to reach segments of equal duration; (vi) common choices include: (a) discarding part of the content (also known as trimming), or (b) adding content such as arbitrary images or silence (also known as naïve padding); (vii) trimming is undesirable because the discarded content may have been influential to the analysis; (viii) naïve padding is also undesirable because the model will analyze the padding as part of the segment, even though it has no relevance to the content piece; and (ix) some known solutions in the art include: (a) accept that some segments fed to the machine learning model will be shorter in duration, (b) trim segments to the desired length by discarding content, and (c) use naïve padding such as arbitrary images or silence.

Some embodiments of the present invention recognize the following facts, potential problems and/or potential areas for improvement with respect to the current state of the art: (i) during a professional tennis match, it was found that short videos were being falsely interpreted with low excitement scores; (ii) within machine learning and deep learning, the input data into models needs to be standardized for accurate predictions; (iii) part of the data preparation for video is to create cuts and segments that are of the same length; (iv) in this example, videos were split into 6 second segments so that a cheer analysis could rank excitement; (v) however, if the video was 8 seconds long, the last segment might contain the most exciting content yet was padded with 4 seconds of silence; and (vi) as a result, the excitement score on the last 6 second segment was artificially low.

Some embodiments of the present invention may include one, or more, of the following features, characteristics and/or advantages: (i) intelligent generation of sound and video to pad segments for machine and deep learning models to increase the accuracy of multimedia interpretation; (ii) segments should be padded as a pre-processing step because multimedia interpretation models perform best when input data is of equal duration; (iii) use generative adversarial networks that are trained on many domain-specific segments to create padding that is consistent with the segment's original content; (iv) generating padding in this manner is preferable to discarding content or padding with arbitrary images and/or silence; (v) generating video and audio that is relevant to the specific segment that is being padded; (vi) when the intelligently padded segment is analyzed by the interpretation model, the analysis will not suffer due to inconsistent data; (vii) a series of content pieces are being analyzed for multimedia interpretation; (viii) a content piece is divided into its video content (images) and its audio content; (ix) both the video and audio are divided into segments of the desired length; (x) if the final segment of video and final segment of audio are not the desired length, they must be padded; (xi) generative adversarial networks (GAN) have been trained against many content pieces to create generative video and/or audio content that is consistent with the individual segment that needs padding; (xii) feature weights are not adversely affected by input data of varying duration; (xiii) all original content is input data for comprehension, so all potential features within that content may be evaluated by the model; (xiv) the model will not search for meaning among content that is arbitrary, as the input data is all relevant to its interpretation; (xv) generation of segment-relevant video content to prepare input data for video analysis machine learning models; and/or (xvi) generation of segment-relevant audio content to prepare input data for audio analysis machine learning models.

Some embodiments of the present invention may include one, or more, of the following features, characteristics and/or advantages: (i) Media Interpretation Model—this term indicates the machine learning model that is analyzing content pieces for their subject matter; (ii) the padding generation subsystem, prepares input data for the interpretation model; (iii) Media Interpretation System—The system consists of both the padding generation subsystem and the media interpretation model; (iv) data preparation for machine learning models occurs within this system; (v) Content Piece—A multimedia track that includes both video (images) and audio; (vi) the content piece will be divided into video and audio and broken into segments; (vii) Segment—the content piece is divided into smaller units which will be the input data for the interpretation model; (viii) both video (images) and audio will be divided into segments; (ix) to improve the performance of the interpretation model, it is desirable that the input data to be segments of equal duration; (x) Final Segment—The partial segment that is the remainder when dividing the video or audio of a content piece into segments of a desired duration; (xi) this segment needs padding, so it will match the lengths of the other segments; (xii) Padding Generation Subsystem—use generative adversarial networks to create video and audio content (padding) that is added to the final segment; (xiii) the discriminator network evaluates whether the padding output of the generator network is consistent with the rest of the specific segment being analyzed; (xiv) Maximum Padding—Maximum padding is the threshold of padding that is acceptable to generate; (xv) for example, if the final segment is only 1 second long before padding and the segment duration needs to be 10 seconds, the padding percentage is 90%; and (xvi) if this exceeds the pre-determined maximum padding, the segment should be discarded and/or trimmed as it is unlikely to be useful data for the media interpretation model.

One example embodiment of a method according to aspects of the present invention may include one or more of the following steps (not necessarily in the following order) including: (i) a collection of content pieces is uploaded to the media interpretation system; (ii) segment duration is a hyperparameter of the media interpretation system, for example, a researcher may establish this duration before beginning analysis; (iii) Maximum padding is a hyperparameter of the padding generation subsystem for example, a researcher may establish this duration before beginning analysis; (iv) the video (images) and audio within a content piece are separated for independent analysis; (v) video of content piece is divided into segments of the desired duration; (vi) determine if padding should be generated by evaluating: (a) if a final partial segment exists, and if determined that a partial segment exists, (b) that the amount of padding does not exceed maximum padding; (vii) the padding generation subsystem is trained on all segments of the content piece, where the generator network will use the features of the final segment to generate content specific to that segment; (viii) the discriminator network will determine whether or not the output of the generator network is appropriate for that specific segment; (ix) the generated padding is added to the final segment; (x) all segments, including the padded final segment are given as input to the media interpretation model; (xi) repeat steps v-x for the audio component of the content piece, instead dividing the audio component of the content piece into segments of the desired duration; (xii) the networks used for audio analysis are independent of those used for video analysis; and/or (xiii) the media interpretation system will ultimately consider both the results of the audio analysis and the results of the video analysis as it scores each content piece.

According to an aspect of the present invention, there is a method, computer program product and/or system that performs the following operations (not necessarily in the following order): (i) using a generative adversarial network (GAN) to generate GAN-generated audio data (as opposed to generating an image, which is what these GANs normally do).

According to an aspect of the present invention, there is a method, computer program product and/or system that performs the following operations (not necessarily in the following order): (i) using a generative adversarial network (GAN) to generate GAN-generated audio data (as opposed to generating an image, which is what these GANs normally do); and (ii) supplying an original video clip of a given length that is shorter than a predetermined length, with the original video clip including original audio data. Wherein the generation of the GAN-generated audio data is based, at least in part, upon the original audio data.

According to an aspect of the present invention, there is a method, computer program product and/or system that performs the following operations (not necessarily in the following order): (i) using a generative adversarial network (GAN) to generate GAN-generated audio data (as opposed to generating an image, which is what these GANs normally do); (ii) supplying an original video clip of a given length that is shorter than a predetermined length, with the original video clip including original audio data; and (iii) combining the original video clip and the GAN-generated audio data to obtain a padded video clip having the predetermined length. Wherein the generation of the GAN-generated audio data is based, at least in part, upon the original audio data.

Figure 5:
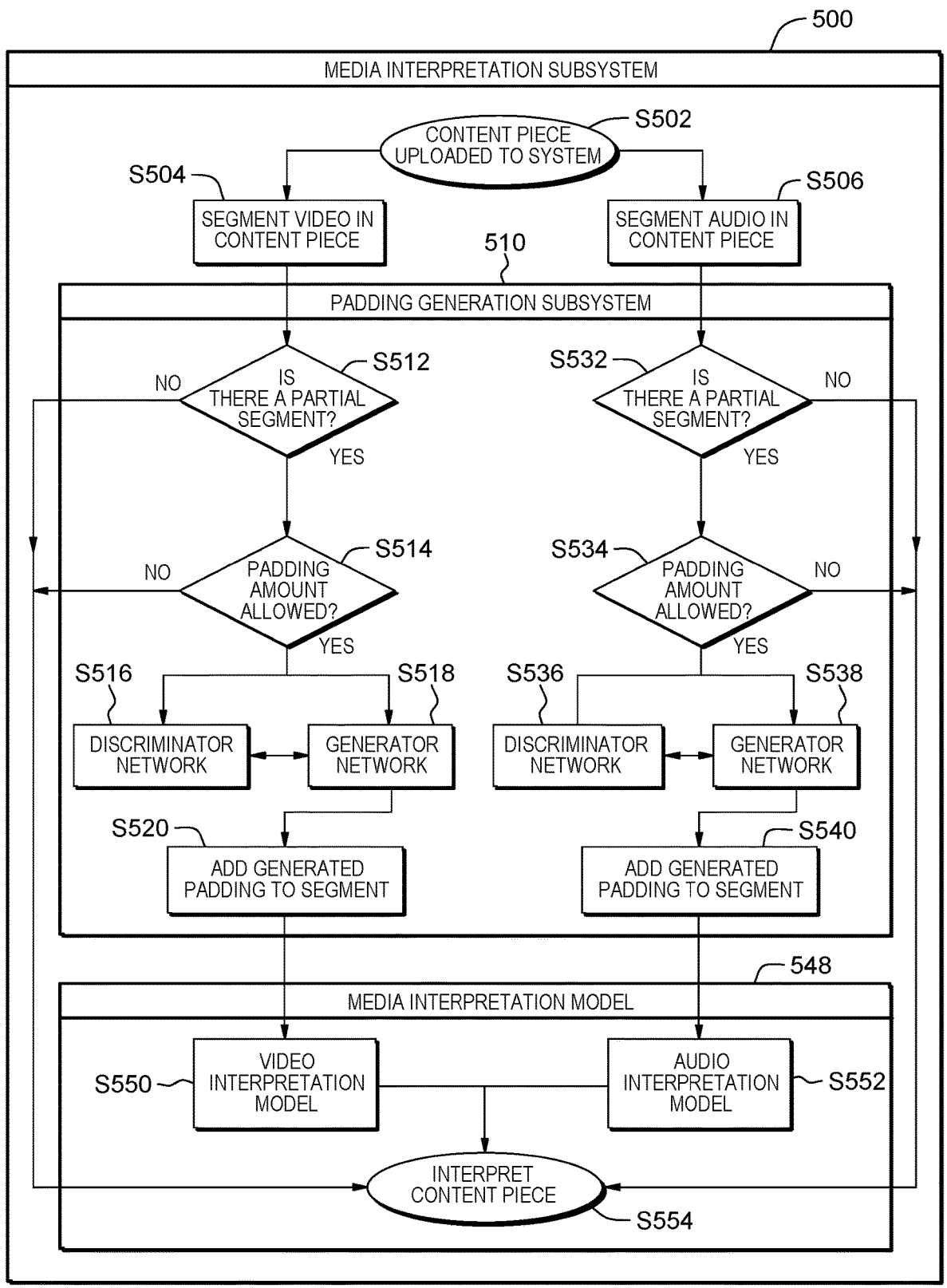
FIG. 5 is a flowchart of a second embodiment of a method according to the present invention.

A method will now be described in accordance to an embodiment of the present invention with reference to FIG. 5, which is carried out by media interpretation system (MIS) 500 and subsystems 510 and 548. The method begins at S502, where a content piece including video and audio content is uploaded to MIS 500. At S504, the video content of the content piece is segmented according to a desired segment duration length, resulting in a plurality of video segments of the desired segment length and a final video segment with a duration length up to the desired duration length. At S512, Padding Generation Subsystem (PGS) 510, a subsystem of MIS 500, determines if the final video segment is a partial segment of a duration length shorter than the desired duration length. If the final video segment is not a partial segment, then the method proceeds to S554 where Media Interpretation Model 548, a subsystem of MIS 500, upon receipt of the audio content, interprets the content piece. If the final video segment is a partial segment, processing proceeds to S514, where PGS 510 determines if there is an allowed padding amount. If there is no allowed padding amount, processing proceeds to S554 as above. If there is an allowed padding amount, processing proceeds to S518, where PGS 510 is trained on the content of the video component of the content piece to determine a meaningful padding video content subsegment to append to the final video segment, referring to a descriminator network at S516 to evaluate if the meaningful padding video content subsegment is appropriate for the content piece. When the descriminator network at S516 determines that the meaningful padding content subsegment is determined to be appropriate for the content piece, it is appended to the final video segment at S520 to create a padded final video segment. At S550, all of the segments of the plurality of segments of the video content, including the padded final video segment, are provided as input to media interpretation model 548. At S554, the input provided from S550 is scored for machine learning purposes alongside any other input that is provided.

In addition to video content as discussed above, a content piece typically includes audio content as well, such as in S502. At S506, the audio content of the content piece is segmented into a plurality of audio segments, according to a desired segment duration length, resulting in a plurality of audio segments of the desired segment duration length and a final audio segment of a duration length up to the desired segment length. At S532, PGS 510 determines if the final audio segment is a partial final audio segment with a duration length less than the desired duration length. If the final audio segment is not a partial final audio segment, processing proceeds to S554, where the plurality of audio segments, including the final audio segment, are provided to media interpretation model 548 for scoring for machine learning purposes. If the final audio segment is a partial final audio segment, processing proceeds to S534, where PGS 510 determines if there is an allowed padding amount. If there is not an allowed padding amount, processing proceeds to S554 as above. If there is an allowed padding amount, processing proceeds to S538, where PGS 510 is trained on the content of the audio component of the content piece to determine a meaningful padding audio content subsegment to append to the final audio segment, referring to a descriminator network at S536 to evaluate if the meaningful padding audio content subsegment is appropriate for the content piece. When the descriminator network at S536 determines that the meaningful padding audio content subsegment is determined to be appropriate for the content piece, it is appended to the final audio segment at S540 to create a padded final audio segment. At S552, all of the segments of the plurality of segments of the audio content, including the padded final audio segment, are provided as input to media interpretation model 548. At S554, the input provided from S552 is scored for machine learning purposes alongside any other input that is provided.

Figure 6:
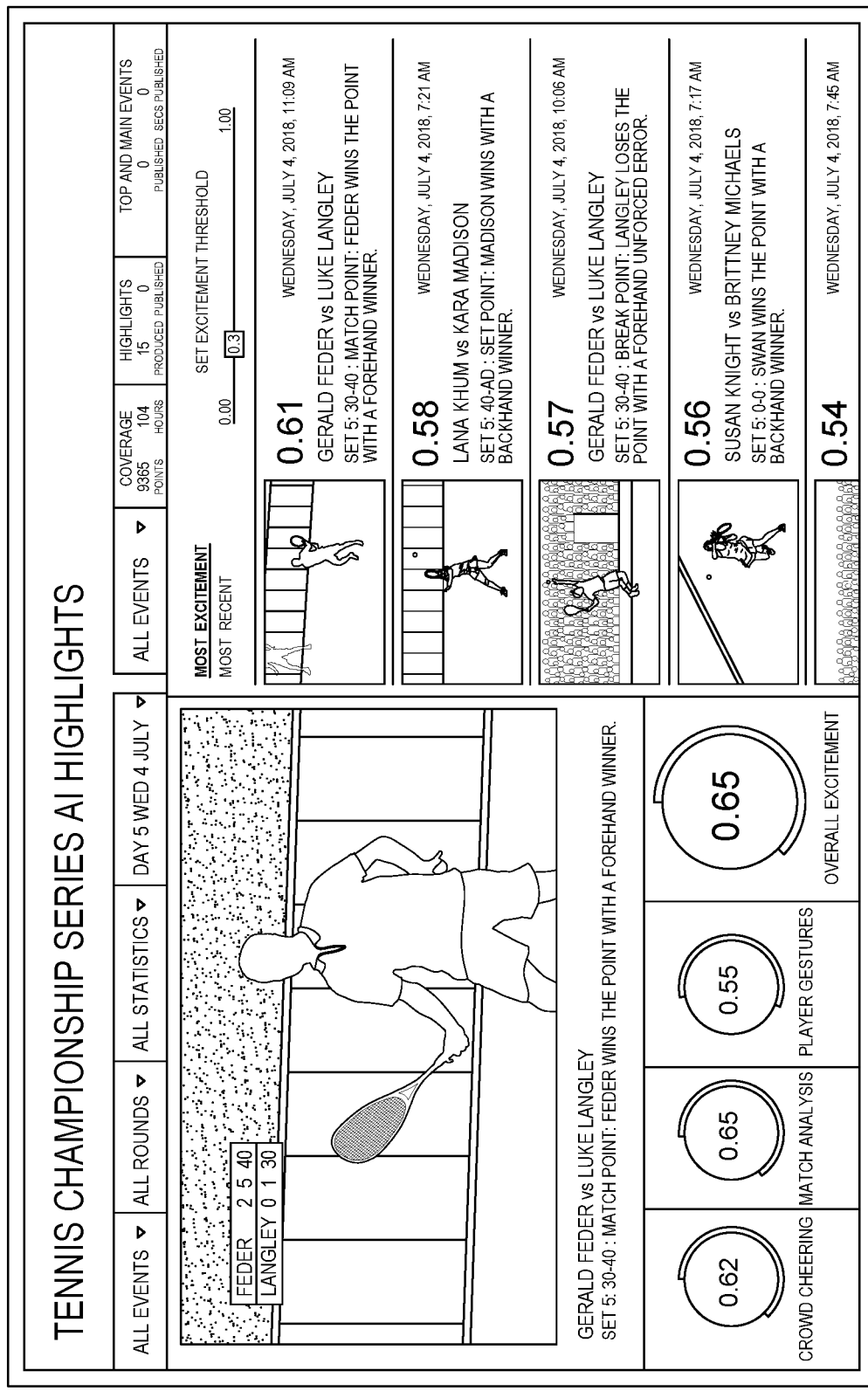
FIG. 6 is a screenshot view showing information that is helpful in understanding one or more example embodiments of the present invention.

Screenshot 600 of FIG. 6 shows an example machine learning video output screen for scoring an excitement level, a measure of how exciting a person may find a particular video clip, of a series of tennis matches from a recent tennis tournament, provided as an example use case for embodiments of the present invention.

Some embodiments of the present invention may include one, or more, of the following features, characteristics and/or advantages: (i) referring to the tennis match example above, the 2 seconds of content of the final/partial segment would be used as a data input into the generative adversarial networks (GAN) that would create entirely new content for the 4 seconds of padding; (ii) the GAN have been trained against other content within the same domain, so it may create padding that fits sequentially; (iii) for example, referring to the tennis match example above, a highlight clip of a given tennis point may end shortly after the winning shot, but learning from other clips, the GAN may create content that includes elements of player celebrations, applause, or spectator reactions; (iv) to the human eye, the created content may or may not seem realistic, but the objective is to prep this segment for a media interpretation model; (v) the addition of those features can help the media interpretation model assess the content more accurately; (vi) the generated padding content may be added to the end of the partial segment; (vii) however, it's possible that with certain content and certain goals it may be appropriate to add content to the beginning or to the middle; (viii) for example, tennis points begin with a serve, and if it is discovered that identifying a service motion is important to the media interpretation model, implementations can elect to pad the beginning of the first segment in hopes the GAN will create elements that the media interpretation model will interpret as a serve; (ix) many machine learning models require that data is normalized; (x) the values of features measured on different scales are adjusted to a common scale; (xi) one goal is to make sure that a value that is large because of its scale does not have an outsized impact on the model; (xii) with deep neural networks, which are commonly used for media interpretation, the researcher typically does not know each feature that the model is using, so it is more difficult to normalize at the feature level; (xiii) the researcher can control the length of the segment fed to the model, so it is common practice to make this consistent; and/or (xiv) otherwise, it is possible that the features in longer segments would have an outsized impact that would skew media interpretation.

Some embodiments of the present invention may use some or all of the following calculations, algorithms, and/or equations:

(i) This calculation is floor division: full_duration_segments=content_piece_duration//segment_duration;

(ii) partial_segment_duration=content_piece_duration−(full_duration_segments*segment_duration);

(iii) padding_duration=segment_duration−partial_segment_duration; and/or (iv) padding_percentage=padding_duration/segment_duration.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

What is claimed is:

1. A method comprising:
receiving a first unpadded audiovisual segment data set including information indicative of a first unpadded audiovisual segment;
determining a set of padding time interval(s) occurring before and/or after the first unpadded segment;
for each given padding time interval of the set of padding time interval(s):
determining a respectively corresponding viewer interest value that would characterize the given padding time interval if the first unpadded audiovisual segment continued through the given padding time interval and had its viewer interest value determined by a machine learning (ML) algorithm, and
generating a synthetic audiovisual segment for the given padding time interval so that the synthetic audiovisual segment for the given padding time interval is characterized by the viewer interest value determined for the given padding time interval;
assembling the first unpadded audiovisual segment with the synthetic audiovisual segment(s) corresponding to each padding time interval of the set of padding time interval(s) to obtain a first padded audiovisual segment data set including information indicative of a first padded audiovisual segment; and
determining, by the ML algorithm, a viewer interest value for the first padded audiovisual segment considered as a whole;
wherein the generation of the synthetic audiovisual segment for each given padding time interval is performed by a generative adversarial network (GAN).

2. The method of claim 1 further comprising:
selecting the first unpadded audiovisual segment for inclusion in a larger video presentation based, at least in part, upon the viewer interest value for the first padded audiovisual segment considered as a whole.

3. The method of claim 1 wherein the synthetic audiovisual segment(s) are not understandable to human viewers.

4. The method of claim 1 wherein:
there are two padding time intervals as follows: (i) a first padding time interval occurring immediately before the first unpadded audiovisual segment, and (ii) a second padding time interval occurring immediately after the first unpadded audiovisual segment; and
the first and second padding time intervals are at least substantially of equal duration.

5. The method of claim 1 further comprising:
training the ML algorithm with a plurality of training data sets, with each training data set including: (i) an audiovisual segment data set including information indicative of an audiovisual segment, and (ii) a viewer interest value;
wherein the generation of the synthetic audiovisual segment for each given padding time interval is based upon the plurality of training data sets.

6. A computer program product (CPP) comprising: a computer readable storage medium; and computer code stored on the machine readable storage device, with the computer code including instructions for causing a processor(s) set to perform operations including the following: receiving a first unpadded audiovisual segment data set including information indicative of a first unpadded audiovisual segment, determining a set of padding time interval occurring before and/or after the first unpadded segment, for each given padding time interval of the set of padding time interval(s): determining a respectively corresponding viewer interest value that would characterize the given padding time interval if the first unpadded audiovisual segment continued through the given padding time interval and had its viewer interest value determined by a machine learning (ML) algorithm, and generating a synthetic audiovisual segment for the given padding time interval so that the synthetic audiovisual segment for the given padding time interval is characterized by the viewer interest value determined for the given padding time interval, assembling the first unpadded audiovisual segment with the synthetic audiovisual segment(s) corresponding to each padding time interval of the set of padding time interval(s) to obtain a first padded audiovisual segment data set including information indicative of a first padded audiovisual segment, and determining, by the ML algorithm, a viewer interest value for the first padded audiovisual segment considered as a whole, wherein the generation of the synthetic audiovisual segment for each given padding time interval is performed by a generative adversarial network (GAN).

7. The CPP of claim 6, wherein the computer code further includes instructions for causing the processor(s) set to perform the following operations:
selecting the first unpadded audiovisual segment for inclusion in a larger video presentation based, at least in part, upon the viewer interest value for the first padded audiovisual segment considered as a whole.

8. The CPP of claim 6 wherein the synthetic audiovisual segment(s) are not understandable to human viewers.

9. The CPP of claim 6 wherein:
there are two padding time intervals as follows: (i) a first padding time interval occurring immediately before the first unpadded audiovisual segment, and (ii) a second padding time interval occurring immediately after the first unpadded audiovisual segment; and
the first and second padding time intervals are at least substantially of equal duration.

10. The CPP of claim 6, wherein the computer code further includes instructions for causing the processor(s) set to perform the following operations:
training the ML algorithm with a plurality of training data sets, with each training data set including: (i) an audiovisual segment data set including information indicative of an audiovisual segment, and (ii) a viewer interest value;
wherein the generation of the synthetic audiovisual segment for each given padding time interval is based upon the plurality of training data sets.

11. A computer system (CS) comprising:
a processor(s) set;
a machine readable storage device; and
computer code stored on the machine readable storage device, with the computer code including instructions for causing the processor(s) set to perform operations including the following:
receiving a first unpadded audiovisual segment data set including information indicative of a first unpadded audiovisual segment,
determining a set of padding time interval(s) occurring before and/or after the first unpadded segment,
for each given padding time interval of the set of padding time interval(s):
determining a respectively corresponding viewer interest value that would characterize the given padding time interval if the first unpadded audiovisual segment continued through the given padding time interval and had its viewer interest value determined by a machine learning (ML) algorithm, and
generating a synthetic audiovisual segment for the given padding time interval so that the synthetic audiovisual segment for the given padding time interval is characterized by the viewer interest value determined for the given padding time interval,
assembling the first unpadded audiovisual segment with the synthetic audiovisual segment(s) corresponding to each padding time interval of the set of padding time interval(s) to obtain a first padded audiovisual segment data set including information indicative of a first padded audiovisual segment, and
determining, by the ML algorithm, a viewer interest value for the first padded audiovisual segment considered as a whole,
wherein the generation of the synthetic audiovisual segment for each given padding time interval is performed by a generative adversarial network (GAN).

12. The CS of claim 11, wherein the computer code further includes instructions for causing the processor(s) set to perform the following operations:
selecting the first unpadded audiovisual segment for inclusion in a larger video presentation based, at least in part, upon the viewer interest value for the first padded audiovisual segment considered as a whole.

13. The CS of claim 11 wherein the synthetic audiovisual segment(s) are not understandable to human viewers.

14. The CS of claim 11 wherein:
there are two padding time intervals as follows: (i) a first padding time interval occurring immediately before the first unpadded audiovisual segment, and (ii) a second padding time interval occurring immediately after the first unpadded audiovisual segment; and
the first and second padding time intervals are at least substantially of equal duration.

15. The CS of claim 11, wherein the computer code further includes instructions for causing the processor(s) set to perform the following operations:
training the ML algorithm with a plurality of training data sets, with each training data set including: (i) an audiovisual segment data set including information indicative of an audiovisual segment, and (ii) a viewer interest value;
wherein the generation of the synthetic audiovisual segment for each given padding time interval is based upon the plurality of training data sets.

* * * * *